(12) United States Patent
Qian

(10) Patent No.: US 12,183,570 B2
(45) Date of Patent: Dec. 31, 2024

(54) METHODS OF FORMING A FIELD EMISSION CATHODE

(71) Applicant: NCX Corporation, Raleigh, NC (US)

(72) Inventor: Cheng Qian, Cary, NC (US)

(73) Assignee: NCX Corporation, Raleigh, NC (US)

( * ) Notice: Subject to any disclaimer, the term of this patent is extended or adjusted under 35 U.S.C. 154(b) by 0 days.

(21) Appl. No.: 18/247,263

(22) PCT Filed: Sep. 29, 2021

(86) PCT No.: PCT/IB2021/058940
§ 371 (c)(1),
(2) Date: Mar. 29, 2023

(87) PCT Pub. No.: WO2022/070096
PCT Pub. Date: Apr. 7, 2022

(65) Prior Publication Data
US 2023/0411102 A1    Dec. 21, 2023

Related U.S. Application Data

(60) Provisional application No. 63/085,531, filed on Sep. 30, 2020.

(51) Int. Cl.
*H01J 9/02* (2006.01)

(52) U.S. Cl.
CPC .................................. *H01J 9/025* (2013.01)

(58) Field of Classification Search
CPC .... H01J 9/025; H01J 9/02; H01J 9/022; H01J 9/027; H01J 2201/30469; H01J 2201/30; H01J 2201/304; H01J 2201/30446; H01J 2201/30453; H01J 1/3048; H01J 1/304; C01B 32/17; C01B 32/158
See application file for complete search history.

(56) References Cited

U.S. PATENT DOCUMENTS

| 10,734,181 | B1 | 8/2020 | Liu et al. |
| 10,811,211 | B1 | 10/2020 | Liu et al. |
| 2004/0055892 | A1 | 3/2004 | Oh et al. |
| 2004/0256975 | A1 | 12/2004 | Gao et al. |
| 2018/0065855 | A1 | 3/2018 | La et al. |

FOREIGN PATENT DOCUMENTS

WO    WO 2007/047949    4/2007

*Primary Examiner* — Anne M Hines
*Assistant Examiner* — Jose M Diaz
(74) *Attorney, Agent, or Firm* — Womble Bond Dickinson (US) LLP

(57) ABSTRACT

A method for fabricating a field emission cathode, the field emission cathode including a substrate having a field emission layer engaged therewith, where the field emission layer includes a plurality of purified carbon nanotubes. The carbon nanotubes are purified via a graphitization or annealing process.

25 Claims, 3 Drawing Sheets

SEM image of deposition layer

METHODS OF FORMING A FIELD EMISSION CATHODE

CROSS-REFERENCE TO RELATED APPLICATIONS

Figure 1:
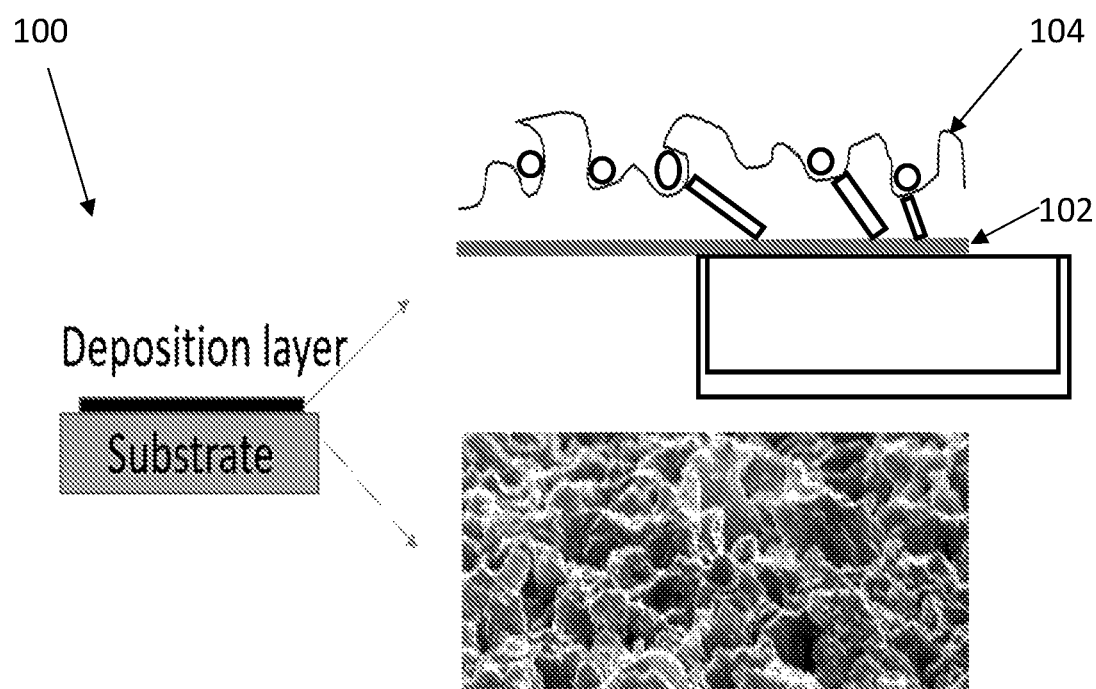

This application is a national stage filing under 35 U.S.C. 371 of PCT/IB2021/058940, filed Sep. 29, 2021, which International Application was published by the International Bureau in English on Apr. 7, 2022, as WO 2022/070096, and application claims priority from U.S. Application No. 63/085,531, filed on Sep. 30, 2020, which applications are hereby incorporated in their entirety by reference in this application.

BACKGROUND

Field of the Disclosure

The present application relates to methods of fabricating field emission cathode devices and, more particularly, to methods of forming field emission cathodes incorporating carbon nanotubes for improved emission characteristics and field emission cathode devices implementing such cathodes.

Description of Related Art

A field emission cathode device generally includes a cathode substrate (usually comprised of a metal or other conducting material such as an alloy, conductive glass, metalized ceramics, doped silicon), a layer of a field emission material (e.g., nanotubes, nanowires, graphene) disposed on the substrate, and, if necessary, an additional layer of an adhesion material disposed between the substrate and the field emission material. Some typical applications of a field emission cathode device include, for example, electronics operable in a vacuum environment, field emission displays, and X-ray tubes.

Carbon nanotubes may be used in the fabrication of field emission cathodes. However, the emission characteristics, such as emitter density, emission current, and emitter lifetime, can be constrained by not only the purity of the carbon nanotubes, but also the carbon nanotube's susceptibility to damage in one or more fabrication steps of manufacturing a field emission device. For example, during the process of depositing the carbon nanotubes on the surface of a cathode, the impurities within the carbon nanotubes greatly affect the uniformity of emitters and decrease the conductivity of emitters, resulting in a low emitter density, low emission current, and a shortened life time of devices using such cathodes.

Thus, there is a need for a process for providing higher quality or purity carbon nanotubes, for providing high-density electron field emitters on a substrate with good uniformity, and for field emission cathodes that are resistant or less prone to damage in subsequent steps of a manufacturing process for forming field emission devices.

SUMMARY OF THE DISCLOSURE

The above and other needs are met by aspects of the present disclosure which includes, without limitation, the following example embodiments and, in one particular aspect, a method of forming a field emission cathode device. The method includes providing a substrate configured to receive a field emission material and depositing the field emission material on to the substrate. The field emission material comprises a plurality of purified carbon nanotubes, where the purified carbon nanotubes are obtained via a graphitization or annealing process.

Another example aspect provides another method of forming a field emission cathode. The method includes purifying a plurality of carbon nanotubes via a graphitization process to obtain a plurality of purified carbon nanotubes and depositing a field emission material comprising the plurality of purified carbon nanotubes on to a substrate to form the cathode.

Yet another example aspect provides an additional method of forming a field emission cathode. The method includes depositing a plurality of carbon nanotubes on to a substrate to form the cathode, and exposing the cathode to a graphitization process to purify the plurality of carbon nanotubes. The plurality of carbon nanotubes is incorporated within the field emission material, which is the medium for depositing the carbon nanotubes on to the substrate.

Still another example aspect provides for a field emission cathode device, where the cathode is fabricated in accordance with any one of the proceeding aspects to obtain a cathode device having a higher emitter density, a higher emission current, and a longer emission life time.

The present disclosure thus includes, without limitation, the following example embodiments:

Example Embodiment 1: A method of forming a field emission cathode, comprising depositing a field emission material on to a substrate, the field emission material comprising a plurality of purified carbon nanotubes, wherein the purified carbon nanotubes are obtained via a graphitization process.

Example Embodiment 2: The method of any preceding example embodiment, or combinations thereof, wherein the graphitization process comprises exposing a plurality of carbon nanotubes to a temperature of at least 1500° C. under a vacuum for a predetermined length of time to purify the plurality of carbon nanotubes.

Example Embodiment 3: The method of any preceding example embodiment, or combinations thereof, wherein exposing the plurality of carbon nanotubes comprises exposing the plurality of carbon nanotubes to a temperature of between 1500° C. and 3000° C.

Example Embodiment 4: The method of any preceding example embodiment, or combinations thereof, wherein exposing a plurality of carbon nanotubes comprises exposing the plurality of carbon nanotubes to a vacuum of about $1\times10^{-3}$ torr to about $1\times10^{-8}$ torr during exposure of the plurality of carbon nanotubes to the temperature.

Example Embodiment 5: The method of any preceding example embodiment, or combinations thereof, wherein exposing a plurality of carbon nanotubes comprises exposing a plurality of carbon nanotubes to the temperature under the vacuum, with the predetermined length of time ranging from about 12 hours to about 72 hours.

Example Embodiment 6: The method of any preceding example embodiment, or combinations thereof, comprising forming the plurality of carbon nanotubes by a chemical vapor deposition process, a laser ablation process, or an arc discharge process.

Example Embodiment 7: The method of any preceding example embodiment, or combinations thereof, wherein depositing the field emission material comprises depositing the field emission material on to the substrate comprising a metal, an alloy, a glass, or a ceramic.

Example Embodiment 8: The method of any preceding example embodiment, or combinations thereof, wherein depositing the field emission material comprising the plurality of purified carbon nanotubes comprises depositing the field emission material on to the substrate via spray coating, ink jet printing, screen printing, dip coating, electrophoresis or combinations thereof.

Example Embodiment 9: The method of any preceding example embodiment, or combinations thereof, further comprising exposing the cathode to a post-deposition process.

Example Embodiment 10: A method of forming a field emission cathode, comprising purifying a plurality of carbon nanotubes via a graphitization process to obtain a plurality of purified carbon nanotubes; and depositing a field emission material comprising the plurality of purified carbon nanotubes on to a substrate to form the cathode.

Example Embodiment 11: The method of any preceding example embodiment, or combinations thereof, comprising forming the plurality of carbon nanotubes by a chemical vapor deposition process, a laser ablation process, or an arc discharge process.

Example Embodiment 12: The method of any preceding example embodiment, or combinations thereof, wherein the graphitization process comprises exposing the plurality of carbon nanotubes to a temperature of about 1500° C. to about 3000° C. under a vacuum of about $1\times10^{-3}$ torr to about $1\times10^{-8}$ torr for a length of time of about 12 hours to about 72 hours.

Example Embodiment 13: The method of any preceding example embodiment, or combinations thereof, wherein depositing the field emission material comprises depositing the field emission material on to the substrate comprising a metal, an alloy, a glass, or a ceramic.

Example Embodiment 14: The method of any preceding example embodiment, or combinations thereof, wherein depositing the field emission material comprises depositing the field emission material comprising the plurality of purified carbon nanotubes on to the substrate via spray coating, ink jet printing, screen printing, dip coating, electrophoresis, or combinations thereof.

Example Embodiment 15: The method of any preceding example embodiment, or combinations thereof, further comprising exposing the cathode to a post-deposition process.

Example Embodiment 16: A method of forming a field emission cathode, comprising depositing a field emission material comprising a plurality of carbon nanotubes on to a substrate to form the cathode; and exposing the cathode to a graphitization process to purify the plurality of carbon nanotubes.

Example Embodiment 17: A field emission cathode device comprising a cathode fabricated in accordance with the method of any preceding example embodiment, or combinations thereof.

These and other features, aspects, and advantages of the present disclosure will be apparent from a reading of the following detailed description together with the accompanying drawings, which are briefly described below. The present disclosure includes any combination of two, three, four, or more features or elements set forth in this disclosure, regardless of whether such features or elements are expressly combined or otherwise recited in a specific embodiment description herein. This disclosure is intended to be read holistically such that any separable features or elements of the disclosure, in any of its aspects and embodiments, should be viewed as intended, namely to be combinable, unless the context of the disclosure clearly dictates otherwise.

It will be appreciated that the summary herein is provided merely for purposes of summarizing some example aspects so as to provide a basic understanding of the disclosure. As such, it will be appreciated that the above described example aspects are merely examples and should not be construed to narrow the scope or spirit of the disclosure in any way. It will be appreciated that the scope of the disclosure encompasses many potential aspects, some of which will be further described below, in addition to those herein summarized. Further, other aspects and advantages of such aspects disclosed herein will become apparent from the following detailed description taken in conjunction with the accompanying drawings which illustrate, by way of example, the principles of the described aspects.

BRIEF DESCRIPTION OF THE SEVERAL VIEWS OF THE DRAWING(S)

Figure 2:
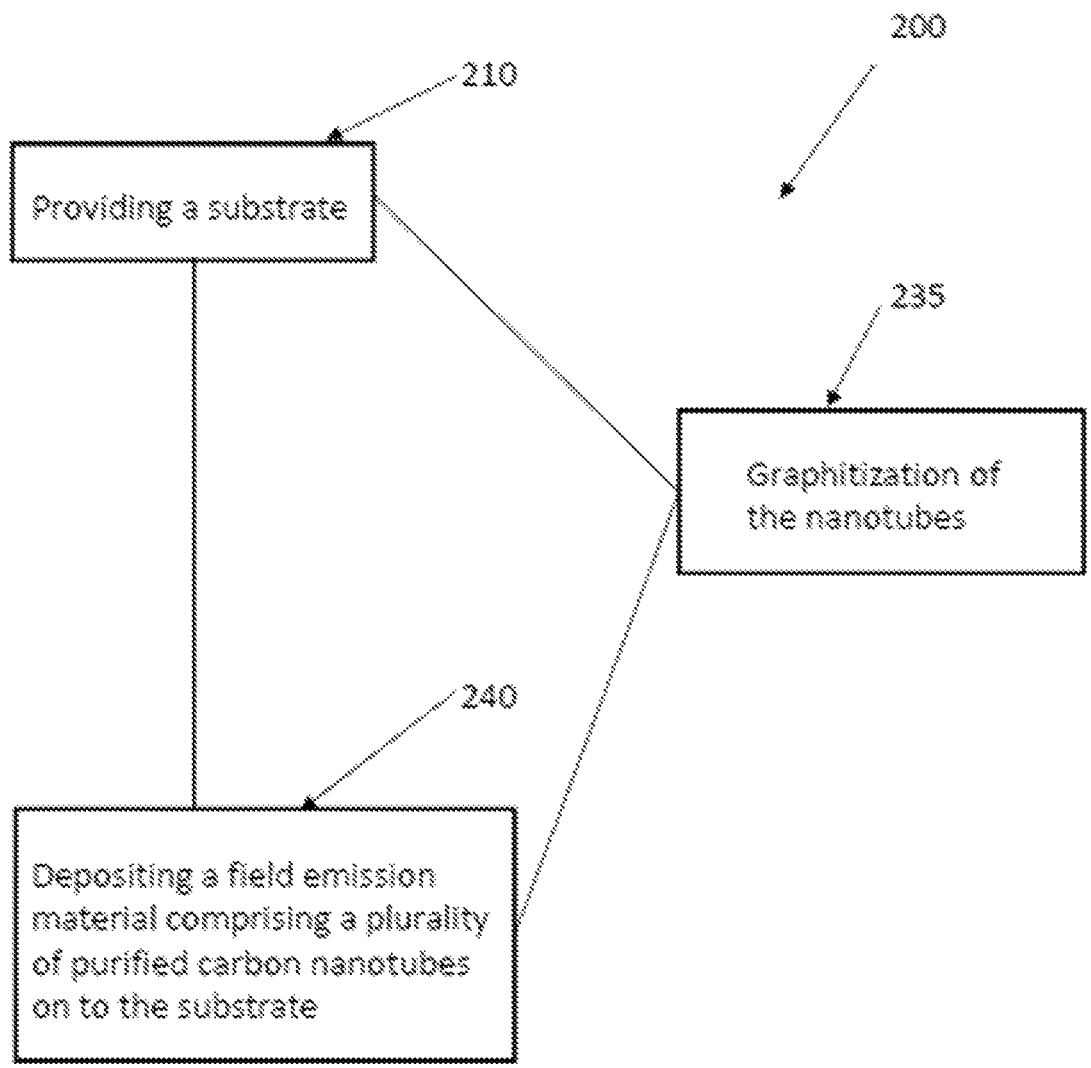
Figure 3:
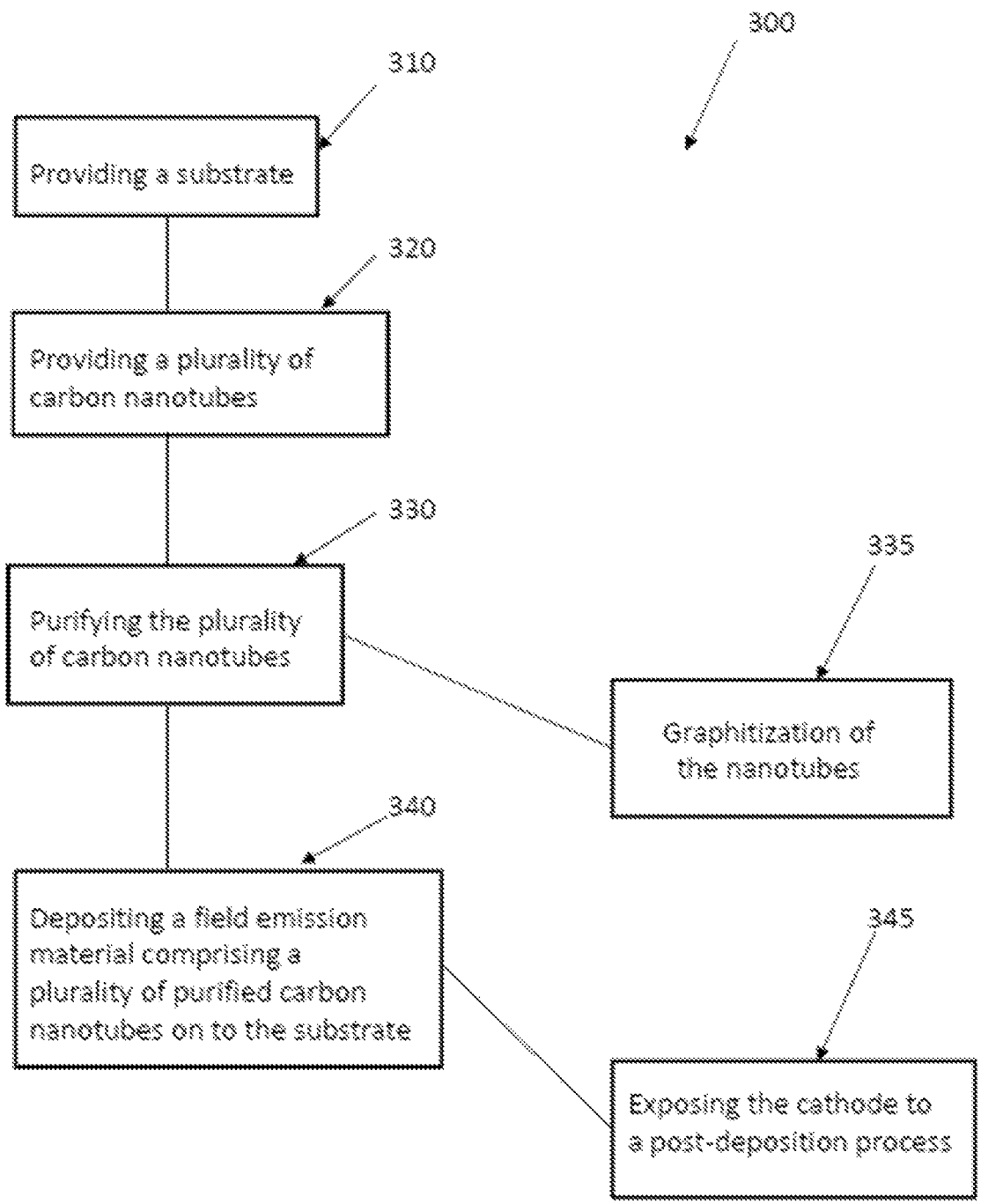

Having thus described the disclosure in general terms, reference will now be made to the accompanying drawings, which are not necessarily drawn to scale, and wherein:

FIG. 1 schematically illustrates an example of a field emission cathode and the nature of the field emission material deposition layer engaged with the cathode substrate;

FIG. 2 illustrates one example of a method of forming a field emission cathode device, according to one or more aspects of the present disclosure; and FIG. 3 illustrates another example of a method of forming a field emission cathode device, according to one or more aspects of the present disclosure.

DETAILED DESCRIPTION OF THE DISCLOSURE

The present disclosure now will be described more fully hereinafter with reference to the accompanying drawings, in which some, but not all aspects of the disclosure are shown. Indeed, the disclosure may be embodied in many different forms and should not be construed as limited to the aspects set forth herein; rather, these aspects are provided so that this disclosure will satisfy applicable legal requirements. Like numbers refer to like elements throughout.

FIG. 1 illustrates one example of a field emission cathode 100 that includes a substrate 102 and a layer of a field emission material 104 disposed on the substrate 102, and, if necessary, an additional layer of an adhesion material (not shown) disposed between the substrate 102 and the field emission material 104. The substrate 102 may be made of an electrically conductive material, such as a metallic material, such as a solid metal or alloy (e.g., stainless steel, doped silicon), conductive glass (e.g., Indium Tin Oxide (ITO) coated glass or other fused glass having a conductive coating on the surface); or a conductive ceramic (e.g., a metalized ceramic, such as aluminum oxide, beryllium oxide, and aluminum nitride). The layer 104 is formed via deposition of a field emission material comprising a plurality of, for example, nanotubes, nanowires, graphene, or combinations thereof on to the substrate 102.

FIGS. 2 and 3 illustrate various methods 200, 300 of using carbon nanotubes in the fabrication of field emission cathodes. Typical as-prepared carbon nanotubes, such as those manufactured by a floating catalyst chemical vapor deposition (FCCVD) method, contain numerous impurities such as catalyst particles, amorphous carbon and other graphitic particles, and intrinsic microstructural defects due to the relatively low processing temperature. Field emission characteristics of cathodes using typical carbon nanotubes as emitters are constrained by not only the purity and defects of carbon nanotubes, but also their susceptibility to damage in one or more fabrication steps of manufacturing a field emission device.

In one aspect of the method (200 in FIG. 2), a substrate, such as those described hereinabove, is provided to a deposition process (step 210), for example, manually or via a robotic material handling system. During the deposition step (step 240), a plurality of purified carbon nanotubes is deposited on to the substrate via the deposition of the field emission material, which may include other components as well, such as, for example, a material to improve adhesion of the field emission material to the substrate. The field emission material comprising the purified carbon nanotubes can be deposited on to the substrate via one or more different processes, such as, for example, spray coating, dip coating, ink jet printing, screen printing, or electrophoresis. The carbon nanotubes are purified via a graphitization or annealing process (step 235). The carbon nanotubes may be purified prior to deposition or provided to the process in a purified form and present in the field emission material.

The graphitization process 235 comprises a vacuum high-temperature annealing process. The process 235 removes both impurities, such as catalyst particles, etc. and microstructural defects within the carbon nanotubes. The graphitization process is a more efficient purification method than acid treatment and may provide significant structural improvements to the carbon nanotubes. In some aspects, the process 235 begins with introducing a plurality of carbon nanotubes (e.g., carbon nanotubes manufactured by a chemical vapor deposition process, a laser ablation process, and/or an arc discharge method) to a chamber or similar structure and exposing the carbon nanotubes to a high temperature of about 1500° C. to about 3000° C. under vacuum, such as $1\times10^{-3}$ torr to $1\times10^{-8}$ torr, for a predetermined amount of time. In certain aspects, the predetermined amount of time ranges from about 12 hours to about 72 hours. Exposing the carbon nanotubes to the graphitization process 235 results in high purity graphitized carbon nanotubes with far fewer defects. The purified carbon nanotubes are then deposited onto the substrate. After the vacuum firing and activating process, a field emission cathode that has high emitter density and large emission current is obtained. The field emission devices using such field emission cathodes have significantly improved lifetimes.

In another aspect of the method (300 in FIG. 3), a substrate, such as those described hereinabove, is provided to a deposition process (step 310). For example, a single substrate or a plurality of substrates is loaded into a build chamber of a piece of deposition equipment. In step 320, a plurality of carbon nanotubes is provided. In some cases, the deposition equipment may include the necessary equipment to carry out a purification process (step 330) (i.e., graphitization) on the plurality of carbon nanotubes; while in other cases, the carbon nanotubes may be purified via a separate graphitization process (step 335).

Once the purified carbon nanotubes have been obtained and incorporated into the field emission material, the field emission material is introduced to the deposition equipment and the deposition step (step 240) may begin. The field emission material comprising the plurality of purified carbon nanotubes may be deposited on to the substrate via one or more different processes, such as, for example, spray coating, dip coating, ink jet printing, screen printing, or electrophoresis. In some cases, the graphitization process 235 may take place after the carbon nanotubes have been deposited on to the substrate. For example, the deposition equipment may include the capability to expose the cathode to a high temperature of about 1500° C. to about 3000° C. under vacuum, such as $1\times10^{-3}$ torr to $1\times10^{-8}$ torr, for a predetermined amount of time, such as about 12 hours to about 72 hours. The field emission material may be subjected to one or more other processes (such as drying, annealing, and/or activating) after deposition on the substrate, then the finished product is a field emission cathode. The substrate may be made of a metal, an alloy, a conductive glass, or a metalized ceramic. The substrate may be provided to the appropriate equipment via, for example, a robotic material handling system or manually by a user.

Many modifications and other embodiments of the inventions set forth herein will come to mind to one skilled in the art to which these disclosed embodiments pertain having the benefit of the teachings presented in the foregoing descriptions and the associated drawings. Therefore, it is to be understood that embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the disclosure. In this regard, for example, different combinations of elements and/or functions than those explicitly described above are also contemplated within the scope of the disclosure. Although specific terms are employed herein, they are used in a generic and descriptive sense only and not for purposes of limitation.

It should be understood that although the terms first, second, etc. may be used herein to describe various steps or calculations, these steps or calculations should not be limited by these terms. These terms are only used to distinguish one operation or calculation from another. For example, a first calculation may be termed a second calculation, and, similarly, a second step may be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

That which is claimed is:

1. A method of forming a field emission cathode, comprising:
    depositing a field emission material on to a substrate, the field emission material comprising a plurality of purified carbon nanotubes, wherein the purified carbon nanotubes are obtained via a graphitization process, the graphitization process comprising exposing a plurality of carbon nanotubes to a temperature of at least 1500° C. under a vacuum for a predetermined length of time ranging from about 12 hours to about 72 hours to purify the plurality of carbon nanotubes.

2. The method of claim 1, wherein exposing the plurality of carbon nanotubes comprises exposing the plurality of carbon nanotubes to a temperature of between 1500° C. and 3000° C.

3. The method of claim 1, wherein exposing a plurality of carbon nanotubes comprises exposing the plurality of carbon nanotubes to a vacuum of about $1\times10^{-3}$ torr to about $1\times10^{-8}$ torr during exposure of the plurality of carbon nanotubes to the temperature.

4. The method of claim 1, comprising forming the plurality of carbon nanotubes by a chemical vapor deposition process, a laser ablation process, or an arc discharge process.

5. The method of claim 1, wherein depositing the field emission material comprises depositing the field emission material on to the substrate comprising a metal, an alloy, a glass, or a ceramic.

6. The method of claim 1, wherein depositing the field emission material comprising the plurality of purified carbon nanotubes comprises depositing the field emission material on to the substrate via spray coating, ink jet printing, screen printing, dip coating, electrophoresis or combinations thereof.

7. The method of claim 1, further comprising exposing the cathode to a post-deposition process.

8. The method of claim 1, further comprising exposing the cathode to a post-deposition process.

9. A method of forming a field emission cathode, comprising:
purifying a plurality of carbon nanotubes via a graphitization process, the graphitization process comprising exposing a plurality of carbon nanotubes to a temperature of at least 1500° C. under a vacuum for a predetermined length of time ranging from about 12 hours to about 72 hours to purify the plurality of carbon nanotubes, to obtain a plurality of purified carbon nanotubes; and
depositing a field emission material comprising the plurality of purified carbon nanotubes on to a substrate to form the cathode.

10. The method of claim 9, comprising forming the plurality of carbon nanotubes by a chemical vapor deposition process, a laser ablation process, or an arc discharge process.

11. The method of claim 9, wherein the graphitization process comprises exposing the plurality of carbon nanotubes to a temperature of about 1500° C. to about 3000° C. under a vacuum of about $1\times10^{-3}$ torr to about $1\times10^{-8}$ torr for a length of time of about 12 hours to about 72 hours.

12. The method of claim 9, wherein depositing the field emission material comprises depositing the field emission material on to the substrate comprising a metal, an alloy, a glass, or a ceramic.

13. The method of claim 9, wherein depositing the field emission material comprises depositing the field emission material comprising the plurality of purified carbon nanotubes on to the substrate via spray coating, ink jet printing, screen printing, dip coating, electrophoresis, or combinations thereof.

14. The method of claim 9, further comprising exposing the cathode to a post-deposition process.

15. A method of forming a field emission cathode, comprising:
depositing a field emission material comprising a plurality of carbon nanotubes on to a substrate to form the cathode; and
exposing the cathode to a graphitization process, the graphitization process comprising exposing a plurality of carbon nanotubes to a temperature of at least 1500° C. under a vacuum for a predetermined length of time ranging from about 12 hours to about 72 hours, to purify the plurality of carbon nanotubes.

16. A method of forming a field emission cathode, comprising:
depositing a field emission material on to a substrate, the field emission material comprising a plurality of purified carbon nanotubes, wherein the purified carbon nanotubes are obtained via a graphitization process, the graphitization process comprising exposing the plurality of carbon nanotubes to a temperature of about 1500° C. to about 3000° C. under a vacuum of about $1\times10^{-3}$ torr to about $1\times10^{-8}$ torr for a length of time of about 12 hours to about 72 hours.

17. The method of claim 16, comprising forming the plurality of carbon nanotubes by a chemical vapor deposition process, a laser ablation process, or an arc discharge process.

18. The method of claim 16, wherein depositing the field emission material comprises depositing the field emission material on to the substrate comprising a metal, an alloy, a glass, or a ceramic.

19. The method of claim 16, wherein depositing the field emission material comprising the plurality of purified carbon nanotubes comprises depositing the field emission material on to the substrate via spray coating, ink jet printing, screen printing, dip coating, electrophoresis or combinations thereof.

20. A method of forming a field emission cathode, comprising:
purifying a plurality of carbon nanotubes via a graphitization process, the graphitization process comprising exposing the plurality of carbon nanotubes to a temperature of about 1500° C. to about 3000° C. under a vacuum of about $1\times10^{-3}$ torr to about $1\times10^{-8}$ torr for a length of time of about 12 hours to about 72 hours, to obtain a plurality of purified carbon nanotubes; and
depositing a field emission material comprising the plurality of purified carbon nanotubes on to a substrate to form the cathode.

21. The method of claim 20, comprising forming the plurality of carbon nanotubes by a chemical vapor deposition process, a laser ablation process, or an arc discharge process.

22. The method of claim 20, wherein depositing the field emission material comprises depositing the field emission material on to the substrate comprising a metal, an alloy, a glass, or a ceramic.

23. The method of claim 20, wherein depositing the field emission material comprises depositing the field emission material comprising the plurality of purified carbon nanotubes on to the substrate via spray coating, ink jet printing, screen printing, dip coating, electrophoresis, or combinations thereof.

24. The method of claim 20, further comprising exposing the cathode to a post-deposition process.

25. A method of forming a field emission cathode, comprising:
depositing a field emission material comprising a plurality of carbon nanotubes on to a substrate to form the cathode; and
exposing the cathode to a graphitization process, the graphitization process comprising exposing the plurality of carbon nanotubes to a temperature of about 1500° C. to about 3000°° C. under a vacuum of about $1\times10^{-3}$ torr to about $1\times10^{-8}$ torr for a length of time of about 12 hours to about 72 hours, to purify the plurality of carbon nanotubes.

\* \* \* \* \*